UNITED STATES PATENT OFFICE.

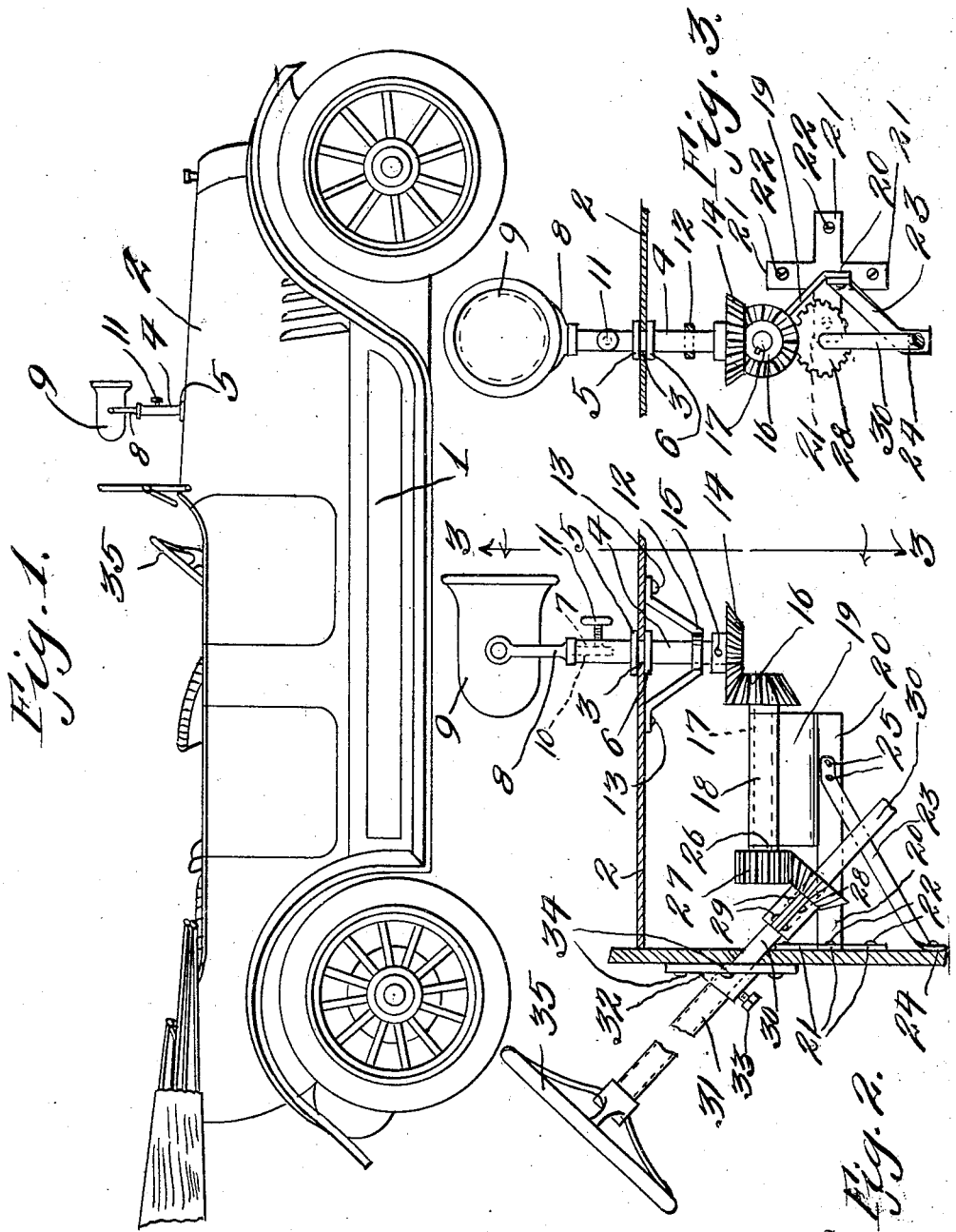

IVAN KELLY, OF LAKE BUTLER, FLORIDA.

DIRIGIBLE LAMP FOR AUTOMOBILES.

1,198,453.  Specification of Letters Patent. Patented Sept. 19, 1916.

Application filed April 20, 1915. Serial No. 22,670.

*To all whom it may concern:*

Be it known that I, IVAN KELLY, a citizen of the United States, residing at Lake Butler, in the county of Bradford and State of Florida, have invented a new and useful Dirigible Lamp for Automobiles; and I do hereby declare the following to be a full, clear, and exact description of the invention, such as will enable others skilled in the art to which it appertains to make and use the same.

This invention relates to the art of illumination, and particularly to an improved dirigible lamp for automobiles, and an object of the invention is the provision of means for connecting a lamp swivelly supported upon the hood of the automobile, and the steering shaft of the steering wheel, whereby as the steering wheel is rotated in one direction or the other, for turning the front wheels to the right or left, the lamp will be correspondingly moved, in order that the rays from the lamp will follow the direction in which the automobile is guided.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in side elevation of an automobile, showing the dirigible lamp as applied thereto and geared to the steering shaft of the steering wheel, in order to move correspondingly therewith. Fig. 2 is a vertical sectional view through a section of the hood showing the gear connections between the lamp and the steering shaft. Fig. 3 is a sectional view on line 3—3 of Fig. 2.

Referring more especially to the drawings, 1 designates an automobile, provided with the usual hood 2. Extending through and mounted in a bearing 3 of the hood is a vertical shaft 4, prevented from axial vertical movement by the collars 5 and 6, and provided with a socket 7. A forked member 8 is provided, in bearings of the forks of which the pintles of the lamp 9 are mounted. This forked member has an extension 10, which fits the socket 7 and is held therein by the set screw 11. The shaft 4 is mounted in an additional bearing 12, which is fixed at 13 to the hood 2. On the lower end of the shaft 4 a beveled gear 14 is fixed at 15, and which gear 14 meshes with the gear 16 on the shaft 17, which is mounted in suitable bearings 18. This bearing 18 is in the form of a cylindrical sleeve forming an integral part of an angularly disposed plate arm 19 of a forwardly extending bracket arm 20, one end of which is provided with four arms 21, which are secured at 22 to the rear portion of the hood as shown. The arm 20 is braced by the rearwardly and laterally extending brace 23, one end being secured at 24 to the hood, the other end being secured at 25 to the arm 20. The shaft 17 has on its end 26 a gear 27 meshing with a beveled gear 28, which is split, thereby forming two parts secured together as at 29, in order that the gear 28 may be applied to a steering shaft of any automobile now in use, especially those, in which the steering shaft passes angularly through the hood. The steering shaft 30 passes through the usual steering shaft holding the column 31, which is held in the bearing member 32 by the set screw 33, the bearing member 32 being secured to the hood as at 34. The steering shaft 30 has the usual steering wheel 35. It is to be noted that if the steering wheel 35 is turned to the right, the gear 28 will correspondingly move, thereby rotating the shaft 17 through the medium of the gear 27, and through the medium of the gears 14 and 16, the lamp 9 will also be thrown to the right. A reverse movement of the turn wheel 35, will therefore throw the lamp 9 to the left.

I claim—

In combination with a steering shaft of an automobile, a beveled gear on said shaft, a supporting bracket secured on the forward face of the dash of the automobile extending forwardly within the hood, said bracket carrying a bearing sleeve, a vertical shaft carried by said hood and supporting a lamp at its upper end and a beveled gear at its lower end, means to prevent axial vertical movement of the vertical shaft, a horizontal shaft mounted in the bearing sleeve having a gear at one end meshing with the beveled gear on the steering shaft, and a beveled gear at the other end of the horizontal shaft meshing with the beveled gear of the vertical shaft.

In testimony whereof I have signed my name to this specification in the presence of two subscribing witnesses.

IVAN KELLY.

Witnesses:
L. R. MOORE,
R. L. O'BERRY.

Copies of this patent may be obtained for five cents each, by addressing the "Commissioner of Patents, Washington, D. C."